United States Patent
Liu et al.

(10) Patent No.: US 12,468,577 B2
(45) Date of Patent: Nov. 11, 2025

(54) CLOUD COMPUTING RESOURCE EXTENSION METHOD, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Jinshuai Liu, Beijing (CN); Peilong Wang, Beijing (CN); Yan Wang, Beijing (CN); Hu Li, Beijing (CN); Fei Chen, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 502 days.

(21) Appl. No.: 18/102,838

(22) Filed: Jan. 30, 2023

(65) Prior Publication Data
US 2024/0061720 A1    Feb. 22, 2024

(30) Foreign Application Priority Data
Aug. 16, 2022    (CN) .......................... 202210986036.6

(51) Int. Cl.
G06F 9/50    (2006.01)
(52) U.S. Cl.
CPC .......... *G06F 9/5072* (2013.01); *G06F 9/5077* (2013.01)
(58) Field of Classification Search
CPC .............................. G06F 9/5072; G06F 9/5077
See application file for complete search history.

(56) References Cited

U.S. PATENT DOCUMENTS

| | | | | |
|---|---|---|---|---|
| 12,075,254 B1* | 8/2024 | Gupta | ................... | H04W 12/37 |
| 12,167,264 B1* | 12/2024 | McEvilly | ............ | H04L 43/0876 |
| 12,190,144 B1* | 1/2025 | Featonby | .............. | H04L 67/568 |
| 2021/0194847 A1* | 6/2021 | Gu | ........................ | G06F 9/5072 |
| 2025/0193201 A1* | 6/2025 | Lin | ........................ | H04L 63/20 |

FOREIGN PATENT DOCUMENTS

| | | |
|---|---|---|
| CN | 107682184 A | 2/2018 |
| CN | 113835834 A | 12/2021 |
| CN | 114500120 A | 5/2022 |
| CN | 114902183 A | 8/2022 |

OTHER PUBLICATIONS

Office Action of Chinese patent application No. 202210986036.6 dated Apr. 9, 2025, 11 pages.

* cited by examiner

*Primary Examiner* — Sisley N Kim
(74) *Attorney, Agent, or Firm* — Brooks Kushman P.C.

(57) ABSTRACT

A cloud computing resource extension method, a Smart Local Compute Cluster (SLCC), and a storage medium are suggested, which relate to the field of artificial intelligence. The method of cloud computing resource extension includes: acquiring registration information of an extended Availability Zone (AZ), the extended AZ being located in a user's local computer room; sending the registration information to a public cloud, the public cloud being configured to register, based on the registration information, the extended AZ with an AZ set managed and controlled by the public cloud and generate deployment information of a target cloud service pre-designated by the user; receiving the deployment information sent by the public cloud; and deploying the target cloud service in the extended AZ based on the deployment information.

20 Claims, 8 Drawing Sheets

CLOUD COMPUTING RESOURCE EXTENSION METHOD, ELECTRONIC DEVICE, AND STORAGE MEDIUM

CROSS-REFERENCE TO RELATED APPLICATIONS

The present application claims the priority of Chinese Patent Application No. 202210986036.6, filed on Aug. 16, 2022, with the title of "CLOUD COMPUTING RESOURCE EXTENSION METHOD, SMART LOCAL COMPUTE CLUSTER, AND STORAGE MEDIUM." The disclosure of the above application is incorporated herein by reference in its entirety.

FIELD OF THE DISCLOSURE

The present disclosure relates to the field of artificial intelligence, specifically to cloud computing and public cloud technologies, which may be applied to intelligent cloud scenarios. In particular, the present disclosure relates to a cloud computing resource extension method, a Smart Local Compute Cluster (SLCC), and a storage medium.

BACKGROUND OF THE DISCLOSURE

Cloud services are based on increase, use, and interaction modes of Internet-related services, which typically involve provision of dynamically scalable and generally virtualized resources over the Internet. Clouds are metaphors for networks and Internet.

Common clouds include public clouds and private clouds, both of which have their own limitations.

SUMMARY OF THE DISCLOSURE

The present disclosure provides a cloud computing resource extension method, an electronic device, and a storage medium.

According to an aspect of the present disclosure, a method of cloud computing resource extension is provided, including: acquiring registration information of an extended Availability Zone (AZ), the extended AZ being located in a user's local computer room; sending the registration information to a public cloud, the public cloud being configured to register, based on the registration information, the extended AZ with an AZ set managed and controlled by the public cloud and generate deployment information of a target cloud service pre-designated by the user; receiving the deployment information sent by the public cloud; and deploying the target cloud service in the extended AZ based on the deployment information.

According to another aspect of the present disclosure, a method of cloud computing resource extension is provided, including: receiving registration information of an extended AZ, the extended AZ being located in a user's local computer room; registering, based on the registration information, the extended AZ with an AZ set managed and controlled by a public cloud, and generating deployment information of a target cloud service pre-designated by the user; and sending the deployment information to an agent, the agent being deployed in the local computer room, the agent being configured to deploy the target cloud service in the extended AZ based on the deployment information.

According to another aspect of the present disclosure, an electronic device is provided, including: at least one processor; and a memory communicatively connected with the at least one processor; wherein the memory stores instructions executable by the at least one processor, and the instructions are executed by the at least one processor to enable the at least one processor to perform a method of cloud computing resource extension, wherein the method includes: acquiring registration information of an extended AZ, the extended AZ being located in a user's local computer room; sending the registration information to a public cloud, the public cloud being configured to register, based on the registration information, the extended AZ with an AZ set managed and controlled by the public cloud and generate deployment information of a target cloud service pre-designated by the user; receiving the deployment information sent by the public cloud; and deploying the target cloud service in the extended AZ based on the deployment information.

According to another aspect of the present disclosure, an electronic device is provided, including: at least one processor; and a memory communicatively connected with the at least one processor; wherein the memory stores instructions executable by the at least one processor, and the instructions are executed by the at least one processor to enable the at least one processor to perform a method of cloud computing resource extension, wherein the method includes: receiving registration information of an extended AZ, the extended AZ being located in a user's local computer room; registering, based on the registration information, the extended AZ with an AZ set managed and controlled by a public cloud, and generate deployment information of a target cloud service pre-designated by the user; and sending the deployment information to an agent, the agent being deployed in the local computer room, the agent being configured to deploy the target cloud service in the extended AZ based on the deployment information.

According to another aspect of the present disclosure, there is provided a non-transitory computer readable storage medium with computer instructions stored thereon, wherein the computer instructions are used for causing a method of cloud computing resource extension, wherein the method includes: acquiring registration information of an extended Availability Zone (AZ), the extended AZ being located in a user's local computer room; sending the registration information to a public cloud, the public cloud being configured to register, based on the registration information, the extended AZ with an AZ set managed and controlled by the public cloud and generate deployment information of a target cloud service pre-designated by the user; receiving the deployment information sent by the public cloud; and deploying the target cloud service in the extended AZ based on the deployment information.

According to another aspect of the present disclosure, there is provided a non-transitory computer readable storage medium with computer instructions stored thereon, wherein the computer instructions are used for causing a method of cloud computing resource extension, wherein the method includes: receiving registration information of an extended AZ, the extended AZ being located in a user's local computer room; registering, based on the registration information, the extended AZ with an AZ set managed and controlled by a public cloud, and generating deployment information of a target cloud service pre-designated by the user; and sending the deployment information to an agent, the agent being deployed in the local computer room, the agent being configured to deploy the target cloud service in the extended AZ based on the deployment information.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Exemplary embodiments of the present disclosure are illustrated below with reference to the accompanying drawings, which include various details of the embodiments of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

To address respective problems of public clouds and private clouds, an embodiment of the present disclosure may provide a network system. The network system may be referred to as an SLCC. The SLCC according to the embodiment of the present disclosure combines advantages of the public clouds and the private clouds.

Service resources may include: a public cloud, a private cloud, and a self-built Internet Data Center (IDC). In addition, the SLCC according to the embodiment of the present disclosure is also a service resource. Comparisons between advantages and disadvantages of the above four service resources may be shown in Table 1 below:

TABLE 1

| Comparative item | Public could | Private cloud | Self-built IDC | SLCC |
|---|---|---|---|---|
| Service deployment | Existing regions of the public cloud are selected | Computer room construction is designated | Self-installation of hardware facilities is required | A customer's IDC is adapted to |
| Resource cost | Payment is made on demand and quantity, and capacity expansion and capacity reduction are flexible | Construction costs and capacity expansion costs are high | Construction costs are high, and capacity expansion and reduction capabilities are absent | Payment is made on demand and quantity, and capacity expansion and capacity reduction are flexible |
| Operation and maintenance cost | The public cloud is responsible for operation and maintenance | Customers perform operation and maintenance by themselves or purchase outsourced operation and maintenance services | Daily management such as monitoring, maintenance, updating, upgrading, and technical support of hardware facilities are performed, and platforms are developed and managed | The public cloud is responsible for operation and maintenance |
| Operation cost | Customers no longer need to pay additional costs for billing, authentication, and other technical systems of the public cloud | A certain proportion of hardware is required to be invested in the management and control over the cloud platform, and an operation system is required to be built for additional costs such as billing and authentication | An operation system and a billing system are self-built | Customers no longer need to pay additional costs for billing, authentication, and other technical systems of the public cloud |

TABLE 1-continued

| Comparative item | Public could | Private cloud | Self-built IDC | SLCC |
|---|---|---|---|---|
| Data security | Multiple tenants are deployed in a hybrid manner in a cluster of the public cloud | Data is customer exclusive and physically isolated | Data is customer exclusive and physically isolated | Data is customer exclusive and physically isolated |
| System upgrade | Online real-time update is performed | Upgrade is complex, and service disruption is generally required | A professional team is required for maintenance and upgrade | Online real-time update is performed |

As can be seen from Table 1, the SLCC combines the advantages of the public cloud and the private cloud.

The advantages and disadvantages of the service resources are compared intuitively above. It may be known from comparison results that the SLCC according to the embodiment of the present disclosure has a better effect.

Overall resources of the public cloud may include a plurality of regions, and each region may be divided into a plurality of AZs.

The SLCC according to the embodiment of the present disclosure will be used as an AZ of the public cloud and arranged in a user's local computer room. In order to be distinguished from a common AZ of the public cloud, the SLCC may also be referred to as an extended AZ.

Specific implementation of the extended AZ will be described below.

Figure 1:
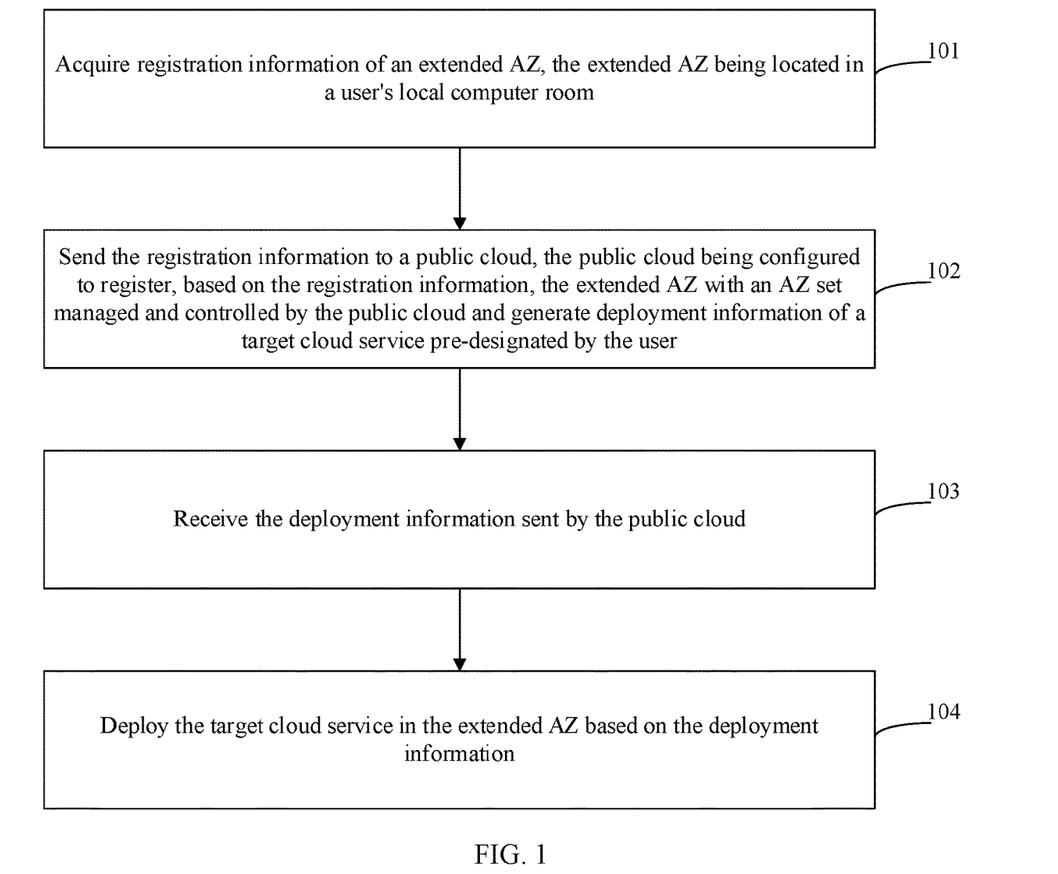
FIG. 1 is a schematic diagram according to a first embodiment of the present disclosure.

FIG. 1 is a schematic diagram according to a first embodiment of the present disclosure. This embodiment provides a method of cloud computing resource extension. As shown in FIG. 1, the method of cloud computing resource extension according to this embodiment includes the following steps.

In 101, registration information of an extended AZ is acquired, the extended AZ being located in a user's local computer room.

In 102, the registration information is sent to a public cloud, the public cloud being configured to register, based on the registration information, the extended AZ with an AZ set managed and controlled by the public cloud, and generate deployment information of a target cloud service pre-designated by the user.

In 103, the deployment information sent by the public cloud is received.

In 104, the target cloud service is deployed in the extended AZ based on the deployment information.

In this embodiment, the method may be applied to an agent. The agent may be referred to as an SLCC agent. The agent may be a kind of software deployed in the user's local computer room.

The extended AZ may be called an SLCC, which is used as the AZ of the public cloud although arranged in the user's local computer room.

In order to realize the management and control over the extended AZ by the public cloud, the extended AZ is required to be registered with the public cloud first.

To this end, the registration information of the extended AZ may be sent to the public cloud so as to be registered with the public cloud.

For example, the AZ set managed and controlled by the public cloud initially includes AZ1 and AZ2. After the extended AZ is registered, the AZ set managed and controlled by the public cloud is updated to include AZ1, AZ2, and the extended AZ.

The user may pre-purchase the target cloud service from the public cloud. After purchase, the public cloud may store a corresponding relationship between a user ID and the target cloud service, and the registration information may also carry the user ID, so that the public cloud can determine, based on the user ID carried in the registration information and the pre-stored corresponding relationship between the user ID and the target cloud service, the target cloud service pre-designated by the user.

Generation rules of deployment information of various cloud services may be configured in the public cloud, and a relationship between registration information and the deployment information may be recorded in the generation rules. Therefore, after the target cloud service is determined, the deployment information of the target cloud service can be generated based on the received registration information and the pre-configured generation rule of the deployment information of the target cloud service.

After obtaining the deployment information of the target cloud service, the public cloud may send the deployment information to the agent, and the agent deploys the target cloud service in the extended AZ based on the deployment information.

In this embodiment, the extended AZ is located in the user's local computer room. Since local computer rooms of different users are physically isolated, extended AZs of the different users can be physically isolated, and data processing may be performed locally by the user, which can improve data security and reduce data processing delay, thereby having the advantages of the private cloud. The extended AZ is registered with the AZ set managed and controlled by the public cloud, which can realize the management and control of the public cloud over the extended AZ, thereby having the advantages of the public cloud. Therefore, the advantages of the public cloud and the private cloud can be combined. In addition, by acquiring the registration information of the extended AZ, uploading the registration information to the public cloud, and deploying a cloud service based on the deployment information sent by the public cloud, automatic deployment of the cloud service can be realized, which prevents the problems of poor efficiency and accuracy of manual deployment.

Figure 2:
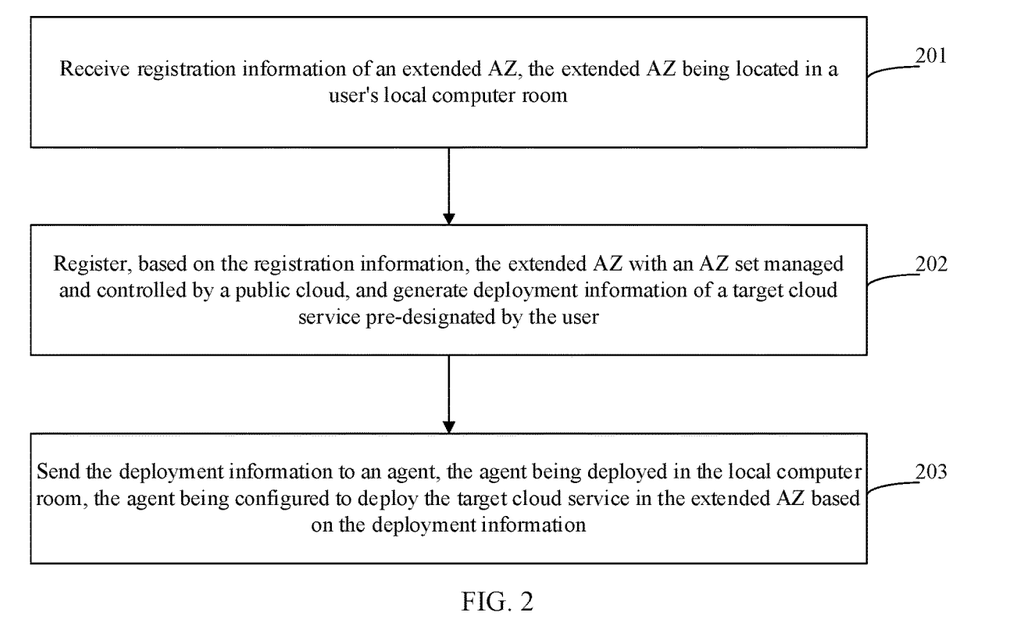
FIG. 2 is a schematic diagram according to a second embodiment of the present disclosure.

FIG. 2 is a schematic diagram according to a second embodiment of the present disclosure. This embodiment provides a method of cloud computing resource extension. As shown in FIG. 2, the method of cloud computing resource extension according to this embodiment includes the following steps.

In 201, registration information of an extended AZ is received, the extended AZ being located in a user's local computer room.

In 202, based on the registration information, the extended AZ is registered with an AZ set managed and controlled by a public cloud, and deployment information of a target cloud service pre-designated by the user is generated.

In 203, the deployment information is sent to an agent, the agent being deployed in the local computer room, the agent being configured to deploy the target cloud service in the extended AZ based on the deployment information.

In this embodiment, the method may be applied to a master. The master may be referred to as an SLCC_master. The master may be a kind of software deployed in the public cloud.

The extended AZ may be called an SLCC, which is used as the AZ of the public cloud although arranged in the user's local computer room.

In order to realize the control over the extended AZ by the public cloud, the extended AZ is required to be registered with the public cloud first.

To this end, the public cloud can receive the registration information of the extended AZ, and based on the registration information of the extended AZ, register the extended AZ with the AZ set managed and controlled by the public cloud.

For example, the AZ set managed and controlled by the public cloud initially includes AZ1 and AZ2. After the extended AZ is registered, the AZ set managed and controlled by the public cloud is updated to include AZ1, AZ2, and the extended AZ.

The user may pre-purchase the target cloud service from the public cloud. After purchase, the public cloud can store a corresponding relationship between a user ID and the target cloud service, and the registration information may also carry the user ID, so that the public cloud can determine, based on the user ID carried in the registration information and the pre-stored corresponding relationship between the user ID and the target cloud service, the target cloud service pre-designated by the user.

Generation rules of deployment information of various cloud services may be configured in the public cloud, and a relationship between registration information and the deployment information may be recorded in the generation rules. Therefore, after the target cloud service is determined, the deployment information of the target cloud service can be generated based on the received registration information and the pre-configured generation rule of the deployment information of the target cloud service.

After obtaining the deployment information of the target cloud service, the public cloud may send the deployment information to the agent, and the agent deploys the target cloud service in the extended AZ based on the deployment information.

In this embodiment, the extended AZ is located in the user's local computer room. Since local computer rooms of different users are physically isolated, extended AZs of the different users can be physically isolated, and data processing may be performed locally by the user, which can improve data security and reduce data processing delay, thereby having the advantages of the private cloud. The extended AZ is registered with the AZ set managed and controlled by the public cloud, which can realize the management and control of the public cloud over the extended AZ, thereby having the advantages of the public cloud. Therefore, the advantages of the public cloud and the private cloud can be combined. In addition, by acquiring the registration information of the extended AZ, uploading the registration information to the public cloud, and deploying a cloud service based on the deployment information sent by the public cloud, automatic deployment of the cloud service can be realized, which prevents the problems of poor efficiency and accuracy of manual deployment.

In order to better understand the embodiments of the present disclosure, application scenarios of the embodiments of the present disclosure are described.

Figure 3:
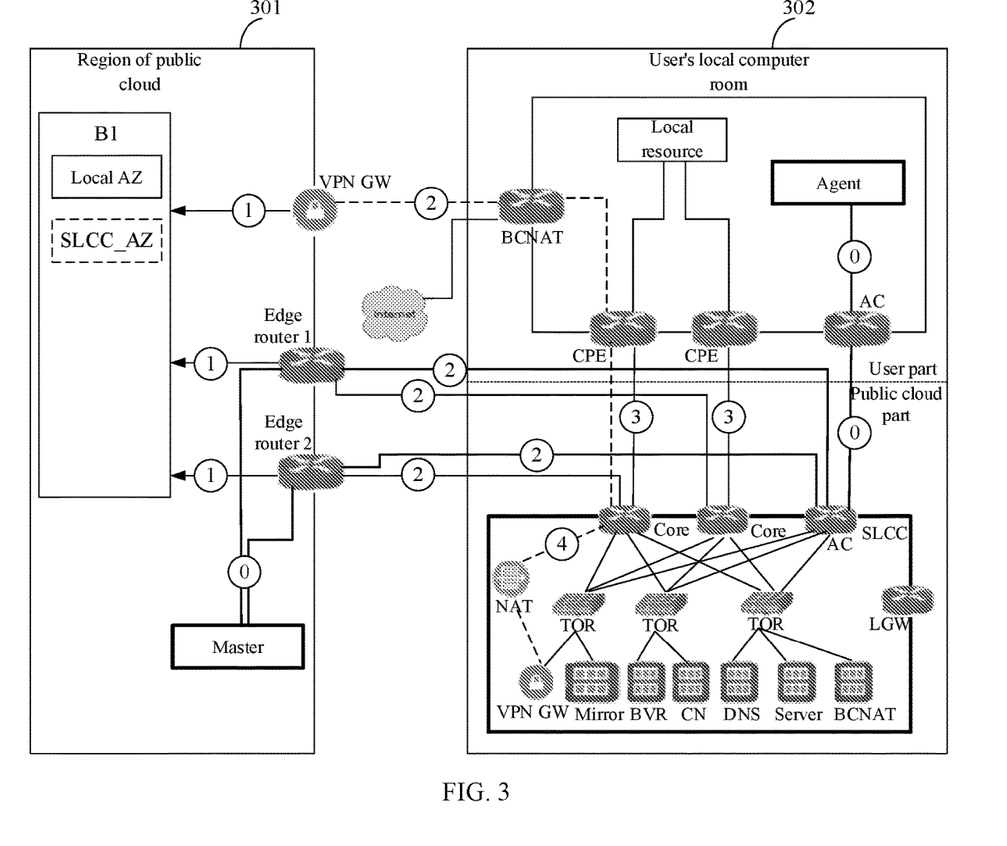
FIG. 3 is a schematic diagram of an application scenario corresponding to an embodiment of the present disclosure.

FIG. 3 is a schematic diagram of an application scenario corresponding to an embodiment of the present disclosure. As shown in FIG. 3, an overall system may include a public cloud region 301 and a user's local computer room 302. After extension, the public cloud may include a cloud part and an extension part. The cloud part is represented by the public cloud region 301, and the extension part may be called an extended AZ, represented by SLCC. The cloud part is located in a cloud, and the extension part is located in the user's local computer room 302.

For the cloud, the public cloud region may include a plurality of backbone networks, such as B1. B1 may include a plurality of AZs. An original AZ of the public cloud may be called a local AZ. After extension, B1 may also include a logical part corresponding to the extended AZ, represented by SLCC AZ.

For a user side, original resources in the user's local computer room are represented by local resources. The local resources are, for example, server clusters. After extension, the extended AZ (that is, SLCC) is also arranged in the user's local computer room. Therefore, the user's local computer room may include a user part and a public cloud part. The user part refers to the original resources in the user's local computer room, and the public cloud part refers to the extended AZ, represented by SLCC.

To enable the SLCC to have the capability of the public cloud, the SLCC is required to be registered with the public cloud.

Generally, AZs of the public cloud are all configured manually, but the manual configuration has problems in terms of efficiency and accuracy.

In this embodiment, as an extended AZ, the SLCC will adopt automatic registration to solve the problem in the manual configuration.

In order to register the SLCC with the public cloud, an agent (SLCC agent) may be deployed on the user side, and a master (SLCC_master) may be deployed in the cloud. The agent and the master may both be software and deployed on existing hardware. For example, the agent is deployed on a server in the user's local resources, and the master is deployed on a server in B1 of the public cloud.

The SLCC may include a network device and a server.

As shown in FIG. 3, the network device may include: a Top of Rack (TOR), a core exchange (represented by a core), an AC, a Virtual Private Network Gateway (VPN GW), a Local Gateway (LGW), and a Network Address Translation (NAT).

The server may include: a mirror server (represented by a mirror), a Baidu Virtual Router (BVR), a Computer Node (CN), a Domain Name System (DNS), a computing or storage server, and a Baidu Cloud NAT (BCNAT).

Figure 4:
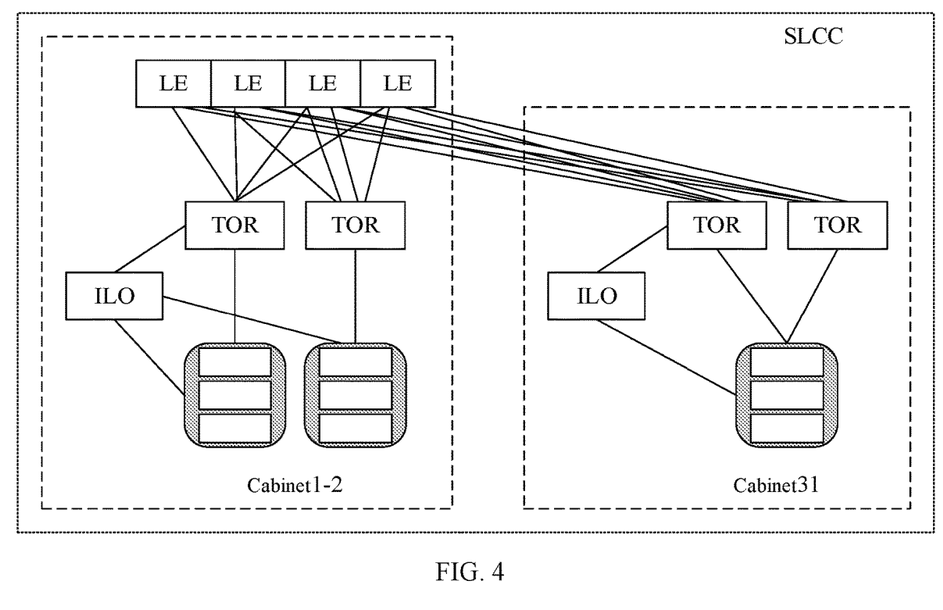
FIG. 4 is a schematic diagram in an embodiment of the present disclosure.

Further, referring to FIG. 4, the core exchange may be a Local Exchange (LE). TORs of different cabinets may be all connected to the LE.

Figure 5:
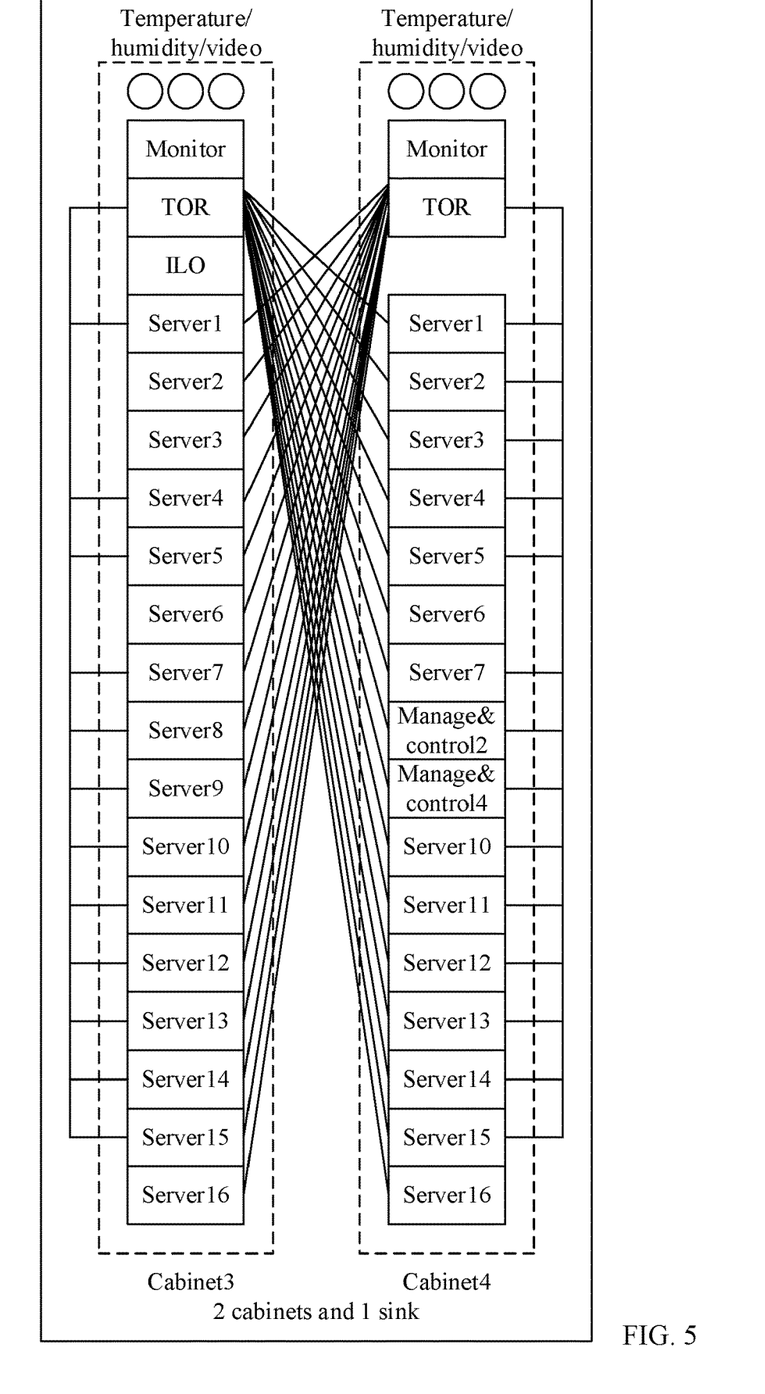
FIG. 5 is a schematic diagram in an embodiment of the present disclosure.

Further, referring to FIG. 5, the cabinet can be arranged with 2 cabinets and 1 sink. Each cabinet may include a plurality of servers, represented by server 1 and the like, and may also include a TOR, a monitoring device, a control device, an Integrated Lights-out (ILO), and the like.

Network channels may include SLCC management channels denoted by 0 and configured to manage devices in the SLCC, specifically including: topology generation of the network device in the SLCC, initialization of the network device in the SLCC, monitoring of the network device in the SLCC, and installation of the server in the SLCC; channels in the cloud denoted by 1 and configured for communication between devices in the cloud; channels to the cloud denoted by 2, interconnected using dedicated lines or VPNs, and configured for cloud computing service management and control traffic, and user service traffic for mutual access between the SLCC and a central cloud; local channels denoted by 3, which are connection channels between the SLCC and the local resources, connect the core exchange in the SLCC with Customer Premises Equipment (CPE) in a local network where the local resources reside, may be implemented using dedicated lines, and configured for mutual access between the SLCC and the local resources; a BCNAT denoted by 4, which is a connection channel between the SLCC and a public network; and an SLCC through train denoted by LGW, which is a connection channel with another SLCC.

In combination with the above application scenarios, an embodiment of the present disclosure further provides a method of cloud computing resource extension.

Figure 6:
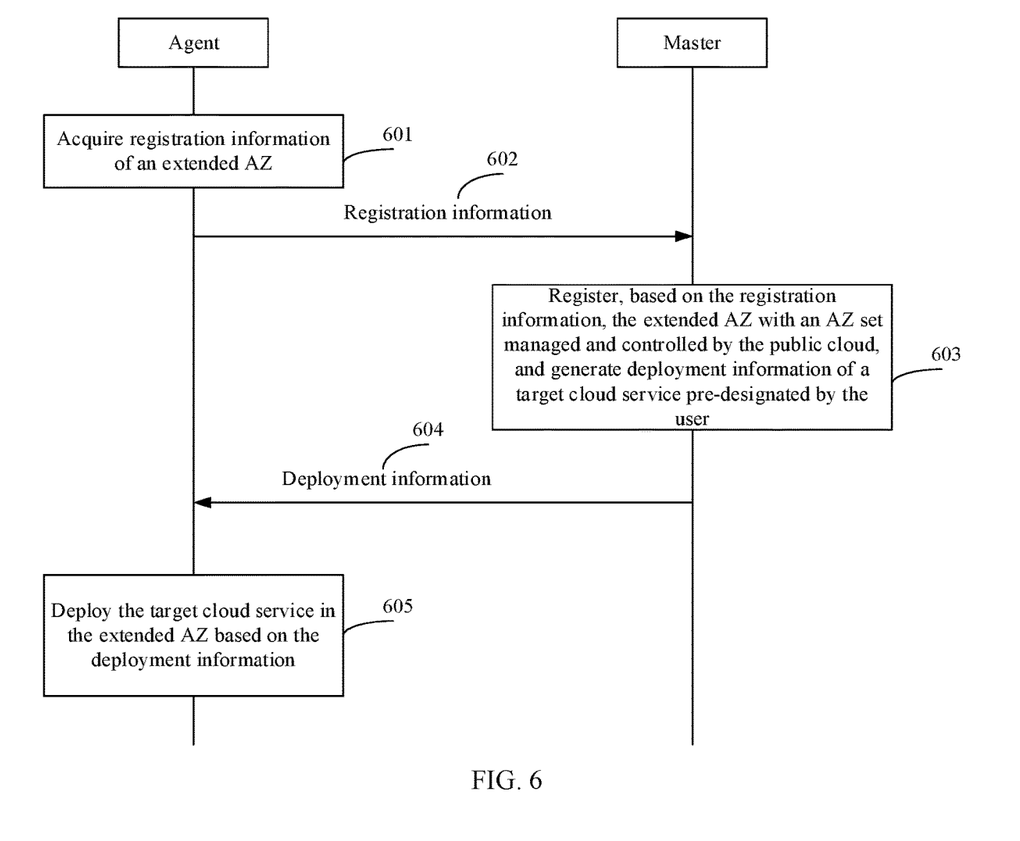
FIG. 6 is a schematic diagram according to a third embodiment of the present disclosure.

FIG. 6 is a schematic diagram according to a third embodiment of the present disclosure. This embodiment provides a method of cloud computing resource extension. As shown in FIG. 6, the method of cloud computing resource extension according to this embodiment includes the following steps.

In 601, an agent acquires registration information of an extended AZ, the extended AZ being located in a user's local computer room.

Referring to FIG. 3, the agent refers to the SLCC agent, and the extended AZ refers to the SLCC.

The registration information may be node information of nodes in the SLCC. The nodes in the SLCC include a network device and a server. Therefore, the node information may include information of the network device and information of the server.

The information of the network device may include: a device model, board card information, port information, module information, and network topology information.

The information of the server may include: CPU information, disk information, memory information, network card information, and a serial number, etc.

Correspondingly, the acquiring registration information of an extended AZ includes: receiving, through a first channel, the node information sent by the extended AZ; wherein the first channel includes: a channel between a first AC and a second AC, and a channel between the second AC and an agent; wherein the agent is deployed in a local network in the local computer room; the first AC is located in the extended AZ; and the second AC is located in the local network.

As shown in FIG. 3, the network where the local resources reside may be called the local network, the AC in the SLCC may be called the first AC, the AC in the local network may be called the second AC, and the first channel refers to the channels corresponding to 0 in the local computer room.

In this embodiment, the node information of the nodes in the extended AZ is transmitted to the agent through the first channel, so that the agent can automatically acquire the node information instead of manual configuration, improving the efficiency and accuracy of information acquisition.

In 602, the agent sends the registration information to a master in a public cloud.

After acquiring the node information, the agent may check the node information according to a pre-configured specification, and send the node information that passes the check to the master. Referring to FIG. 3, the master refers to the SLCC_master.

Specifically, the registration information may be sent to the public cloud through a second channel. The second channel includes: a channel between the agent and the second AC, a channel between the second AC and the first AC, a channel between the first AC and an edge router, and a channel between the edge router and a master. Alternatively, the second channel includes: a channel between the agent and a BCNAT, a channel between the BCNAT and a VPN GW, and a channel between the VPN GW and the master. The master is deployed in the public could. The edge router and the VPN GW are both located in the public could.

For example, referring to FIG. 3, the SLCC agent may transmit the registration information to the SLCC_master through the channels corresponding to 0 in the local computer room, the channels corresponding to 2 between the first AC and (one or more) edge routers, and the channels corresponding to 0 in the public cloud.

In this embodiment, the registration information of the extended AZ is transmitted to the master through the second channel, so that the agent can automatically upload the registration information to the cloud instead of manual configuration, improving the efficiency and accuracy of information acquisition from the cloud.

In 603, the master registers, based on the registration information, the extended AZ with an AZ set managed and controlled by a public cloud, and generates deployment information of a target cloud service pre-designated by the user.

The public cloud may include a variety of nodes, for example, including: a central cloud node, and an infrastructure cloud node.

The central cloud node refers to a node in the public cloud that performs public cloud management and control.

The infrastructure cloud node includes, for example, a SecureDNS (SDNS), a Dynamic Host Configuration Protocol (DHCP), an operation and maintenance management platform, an automatic driving platform, a big data management platform, etc.

Registration is required in both the central cloud node and the infrastructure cloud node. The registration may specifically mean creating AZ instances on the corresponding nodes.

In this embodiment, by creating AZ instances corresponding to the extended AZ on the nodes in the public cloud, the extended AZ can be registered with the AZ set managed and controlled by the public cloud, and then the extended AZ can be managed and controlled by the public cloud, so that the extended AZ has the advantages of the public cloud.

A user ID may be carried in the registration information, the user may pre-purchase the target cloud server, and a corresponding relationship between the user ID and the target cloud service can be saved in the public cloud. Therefore, a target cloud server of the user can be determined based on the user ID carried in the registration information, and deployment information of the target cloud server can be acquired.

A generation specification corresponding to each cloud service may be pre-configured. The generation rule may indicate a relationship between registration information and deployment information, and the corresponding deployment information can be generated based on the generation specification and the registration information.

In 604, the master sends the deployment information to the agent.

The deployment information may be transmitted according to a transmission channel of the registration information. That is, the deployment information is transmitted from the master to the agent through the second channel.

In this embodiment, the deployment information is transmitted to the agent through the second channel, so that the agent can automatically acquire the deployment information instead of manual configuration, and then the agent can automatically deploy the target cloud service, improving the efficiency and accuracy of cloud service deployment.

In addition, the master may also perform cloud-related deployments, which include, for example, creating a gateway-specific cluster in an SLCC instance, deploying a Platform as a Service (PaaS), etc.

When the gateway-specific cluster is created, the master may call a Network Function Virtualization (NVF) platform of the central cloud to perform creation. The gateway-specific cluster may include: a DNS, a Baidu Virtual Router (BVrouter), a BCNAT, a Baidu Gateway (BGW), a Cloud Firewall (CFW), etc. The DNS provides resolution of intranet domain names in the SLCC, and caching and forward capabilities of public network domain names. The VROUTER is a hybrid cloud gateway, which is mainly responsible for intercommunication between resources in the SLCC and the local network and intercommunication with central cloud resources in other regions. The BCNAT provides the SLCC with a public network capability of the SLCC's exclusive EIP network segment. The BGW provides Baidu Load Balance (BLB) services in the SLCC. The CFW provides the SLCC with a CFW capability.

In 605, the agent deploys the target cloud service in the extended AZ based on the deployment information.

Nodes in the extended AZ include: a network device and a server. The deployment information includes: initialization information of the network device, initialization information of the server, and function information of the target cloud service. The deploying the target cloud service in the extended AZ based on the deployment information includes: sending the initialization information of the network device to the network device, so that the network device is configured to initialize the network device based on the initialization information of the network device; sending the initialization information of the server to the server, so that the server is configured to initialize the server based on the initialization information of the server; and sending the function information to the server, so that the server is configured to deploy the target cloud service based on the function information after initialization.

The initialization information of the network device may include a port number, a network address, information of a topology relationship with other network devices, etc. The network device is configured based on the initialization information to complete the initialization. The initialization information of the server may include a port number, a network address, related information (such as a version number) of an operating system, etc. The server may configure and install the operating system based on the initialization information to complete the initialization, that is, realize installation of the server.

After the initialization of the network device and the server, the SLCC agent may report initialization completion information to the SLCC master. Upon completion of the initialization, the server may deploy the target cloud service based on the function information. The function information may be in the form of a template. The server may include a computing node and a storage node. The computing node may deploy the target cloud service according to a computing resource template, and the storage node may deploy the target cloud service according to a storage node template.

In this embodiment, through initialization and deployment of the target cloud service based on the function information, the nodes in the extended AZ can automatically deploy the target cloud service, improving the efficiency and accuracy of cloud service deployment.

Figure 7:
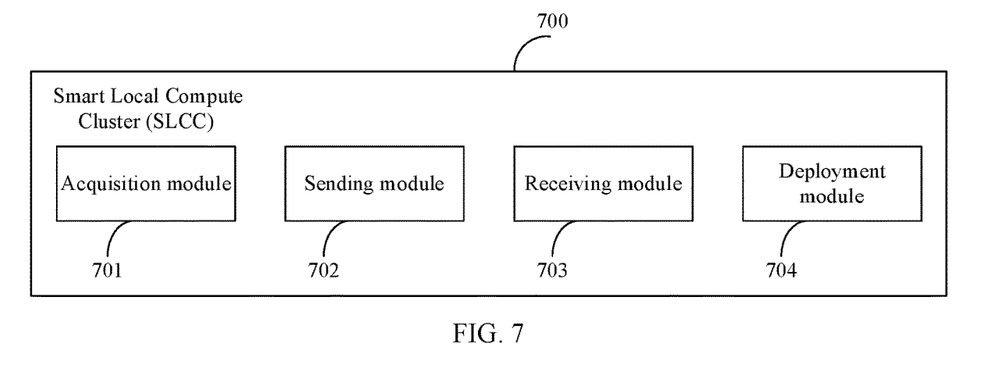
FIG. 7 is a schematic diagram according to a fourth embodiment of the present disclosure.

FIG. 7 is a schematic diagram according to a fourth embodiment of the present disclosure. This embodiment provides an SLCC. The cluster 700 includes: an acquisition module 701, a sending module 702, a receiving module 703, and a deployment module 704.

The acquisition module 701 is configured to acquire registration information of an extended AZ, the extended AZ being located in a user's local computer room. The sending module 702 is configured to send the registration information to a public cloud, the public cloud being configured to register, based on the registration information, the extended AZ with an AZ set managed and controlled by the public cloud and generate deployment information of a target cloud service pre-designated by the user. The receiving module 703 is configured to receive the deployment information sent by the public cloud. The deployment module 704 is configured to deploy the target cloud service in the extended AZ based on the deployment information.

In this embodiment, the extended AZ is located in the user's local computer room. Since local computer rooms of different users are physically isolated, extended AZs of the different users can be physically isolated, and data processing may be performed locally by the user, which can improve data security and reduce data processing delay, thereby having the advantages of the private cloud. The extended AZ is registered with the AZ set managed and controlled by the public cloud, which can realize the management and control of the public cloud over the extended AZ, thereby having the advantages of the public cloud. Therefore, the advantages of the public cloud and the private cloud can be combined. In addition, by acquiring the registration information of the extended AZ, uploading the registration information to the public cloud, and deploying a cloud service based on the deployment information sent by the public cloud, automatic deployment of the cloud service can be realized, which prevents the problems of poor efficiency and accuracy of manual deployment.

In some embodiments, nodes in the extended AZ include: a network device and a server; the deployment information includes: initialization information of the network device, initialization information of the server, and function information of the target cloud service; and the deployment module 704 is further configured to: send the initialization information of the network device to the network device, so that the network device is configured to initialize the network device based on the initialization information of the network device; send the initialization information of the server to the server, so that the server is configured to initialize the server based on the initialization information of the server; and send the function information to the server, so that the server is configured to deploy the target cloud service based on the function information after initialization.

In this embodiment, through initialization and deployment of the target cloud service, the nodes in the extended AZ can automatically deploy the target cloud service, improving the efficiency and accuracy of cloud service deployment.

In some embodiments, the registration information includes node information of the nodes in the extended AZ; and the acquisition module 701 is further configured to: receive, through a first channel, the node information sent by the extended AZ; wherein the first channel includes: a channel between a first AC and a second AC, and a channel between the second AC and an agent; wherein the agent is deployed in a local network in the local computer room; the first AC is located in the extended AZ; and the second AC is located in the local network.

In this embodiment, the node information of the nodes in the extended AZ is transmitted to the agent through the first channel, so that the agent can automatically acquire the node information instead of manual configuration, improving the efficiency and accuracy of information acquisition.

In some embodiments, the sending module 702 is further configured to: send the registration information to the public cloud through a second channel, wherein the second channel includes: a channel between the agent and the second AC, a channel between the second AC and the first AC, a channel between the first AC and an edge router, and a channel between the edge router and a master; or the second channel includes: a channel between the agent and a BCNAT, a channel between the BCNAT and a VPN GW, and a channel between the VPN GW and the master; the master is deployed in the public could; and the edge router and the VPN GW are both located in the public could.

In this embodiment, the registration information of the extended AZ is transmitted to the master through the second channel, so that the agent can automatically upload the registration information to the cloud instead of manual configuration, improving the efficiency and accuracy of information acquisition from the cloud.

Figure 8:
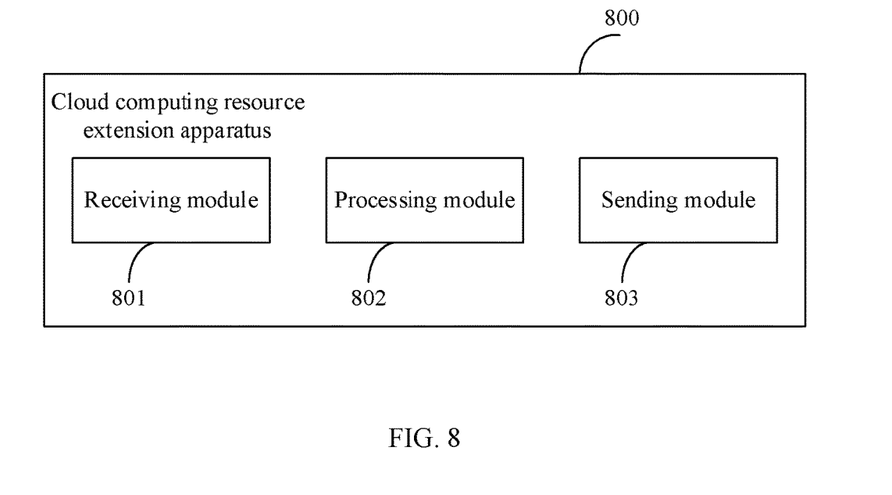
FIG. 8 is a schematic diagram according to a fifth embodiment of the present disclosure.

FIG. 8 is a schematic diagram according to a fifth embodiment of the present disclosure. This embodiment provides a cloud computing resource extension apparatus. The apparatus 800 includes: a receiving module 801, a processing module 802, and a sending module 803.

The receiving module 801 is configured to receive registration information of an extended AZ, the extended AZ being located in a user's local computer room. The processing module 802 is configured to register, based on the registration information, the extended AZ with an AZ set managed and controlled by a public cloud, and generate deployment information of a target cloud service pre-designated by the user. The sending module 803 is configured to send the deployment information to an agent, the agent being deployed in the local computer room, the agent being configured to deploy the target cloud service in the extended AZ based on the deployment information.

In this embodiment, the extended AZ is located in the user's local computer room. Since local computer rooms of different users are physically isolated, extended AZs of the different users can be physically isolated, and data processing may be performed locally by the user, which can improve data security and reduce data processing delay, thereby having the advantages of the private cloud. The extended AZ is registered with the AZ set managed and controlled by the public cloud, which can realize the management and control of the public cloud over the extended AZ, thereby having the advantages of the public cloud. Therefore, the advantages of the public cloud and the private cloud can be combined. In addition, by acquiring the registration information of the extended AZ, uploading the registration information to the public cloud, and deploying a cloud service based on the deployment information sent by the public cloud, automatic deployment of the cloud service can be realized, which prevents the problems of poor efficiency and accuracy of manual deployment.

In some embodiments, the processing module 802 is further configured to: create AZ instances corresponding to the extended AZ on nodes in the public cloud; the nodes in the public cloud including: a central cloud node, and an infrastructure cloud node.

In this embodiment, by creating the AZ instances corresponding to the extended AZ on the nodes in the public cloud, the extended AZ can be registered with the AZ set managed and controlled by the public cloud, and then the extended AZ can be managed and controlled by the public cloud, so that the extended AZ has the advantages of the public cloud.

In some embodiments, the receiving module 801 is further configured to: receive the registration information of the extended AZ through a second channel; wherein the second channel includes: a channel between the agent and a second AC, a channel between the second AC and a first AC, a channel between the first AC and an edge router, and a channel between the edge router and a master; or the second channel includes: a channel between the agent and a BCNAT, a channel between the BCNAT and a VPN GW, and a channel between the VPN GW and the master; wherein the agent is deployed in a local network in the local computer room; the second AC is located in the local network; the first AC is located in the extended AZ; the master is deployed in the public could; and the edge router and the VPN GW are both located in the public could.

In this embodiment, the registration information of the extended AZ is transmitted to the master through the second channel, so that the agent can automatically upload the registration information to the cloud instead of manual configuration, improving the efficiency and accuracy of information acquisition from the cloud.

Figure 9:
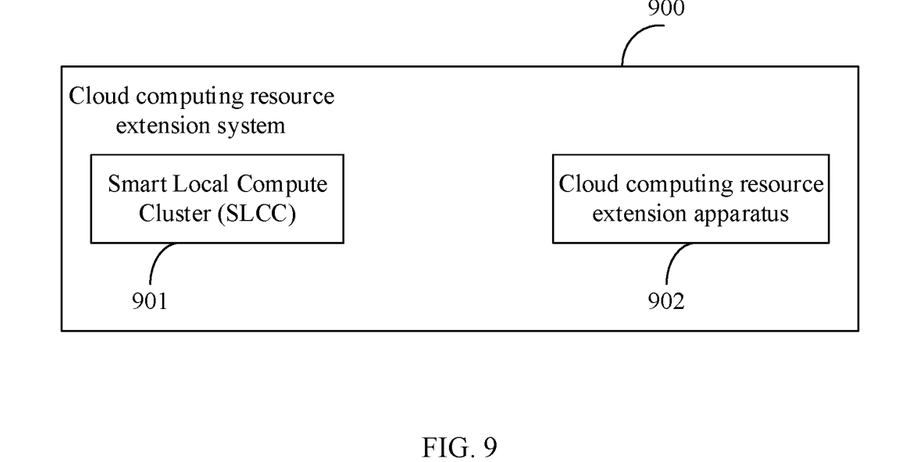
FIG. 9 is a schematic diagram according to a sixth embodiment of the present disclosure.

According to an embodiment of the present disclosure, the present disclosure further provides a cloud computing resource extension system. As shown in FIG. 9, the system 900 includes an SLCC 901 and a cloud computing resource extension apparatus 902. The SLCC may be shown in FIG. 7, and the cloud computing resource extension apparatus may be shown in FIG. 8.

It may be understood that, in the embodiments of the present disclosure, mutual reference may be made to the same or similar contents in different embodiments.

It may be understood that "first", "second", or the like in the embodiments of the present disclosure are intended only for differentiation and do not represent an importance degree, a sequential order, or the like.

Collection, storage, use, processing, transmission, provision, and disclosure of users' personal information involved in the technical solutions of the present disclosure comply with relevant laws and regulations, and do not violate public order and moral.

According to embodiments of the present disclosure, the present disclosure further provides an electronic device, a readable storage medium, and a computer program product.

Figure 10:
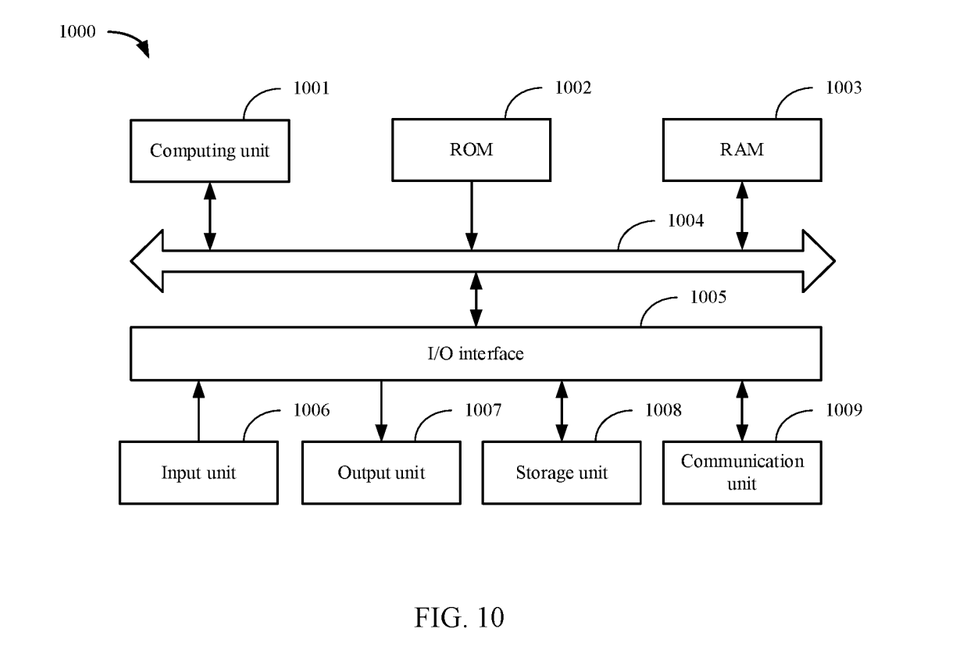
FIG. 10 is a schematic diagram of an electronic device configured to implement a method of cloud computing resource extension according to an embodiment of the present disclosure.

FIG. 10 is a schematic block diagram of an example electronic device 1000 that can be configured to implement embodiments of the present disclosure. The electronic device is intended to represent various forms of digital computers, such as laptops, desktops, workbenches, servers, blade servers, mainframe computers, and other suitable computers. The electronic device 1000 may further represent various forms of mobile devices, such as personal digital assistants, cellular phones, smart phones, wearable devices, and other similar computing devices. The components, their connections and relationships, and their functions shown herein are examples only, and are not intended to limit the implementation of the present disclosure as described and/or required herein.

As shown in FIG. 10, the electronic device 1000 includes a computing unit 1001, which may perform various suitable actions and processing according to a computer program stored in a read-only memory (ROM) 1002 or a computer program loaded from a storage unit 1008 into a random access memory (RAM) 1003. Various programs and data required to operate the electronic device 1000 may also be stored in the RAM 1003. The computing unit 1001, the ROM 1002 and the RAM 1003 are connected to one another by a bus 1004. An input/output (I/O) interface 1005 is also connected to the bus 1004.

A plurality of components in the device 1000 are connected to the I/O interface 1005, including an input unit 1006, such as a keyboard and a mouse; an output unit 1007, such as various displays and speakers; a storage unit 1008, such as disks and discs; and a communication unit 1009, such as a network card, a modem and a wireless communication transceiver. The communication unit 1009 allows the electronic device 1000 to exchange information/data with other devices over computer networks such as the Internet and/or various telecommunications networks.

The computing unit 1001 may be a variety of general-purpose and/or special-purpose processing components with processing and computing capabilities. Some examples of the computing unit 1001 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 1001 performs the methods and processing described above, such as the method of cloud computing resource extension. For example, in some embodiments, the method of cloud computing resource extension may be implemented as a computer software program that is tangibly embodied in a machine-readable medium, such as the storage unit 1008. In some embodiments, part or all of a computer program may be loaded and/or installed on the electronic device 1000 via the ROM 1002 and/or the communication unit 1009. One or more steps of the method of cloud computing resource extension described above may be performed when the computer program is loaded into the RAM 1003 and executed by the computing unit 1001. Alternatively, in other embodiments, the computing unit 1001 may be configured to perform the method of cloud computing resource extension by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable BLB apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, the machine-readable medium may be a tangible medium which may include or store programs for use by or in conjunction with an instruction execution system, apparatus or device. The machine-readable medium may be a machine-readable signal medium or machine-readable storage medium. The machine-readable medium may include, but is not limited to, an electronic, magnetic, optical, electromagnetic, infrared, or semiconductor system, apparatus or device, or any suitable combinations thereof. More specific examples of a machine-readable storage medium may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, speech input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a virtual private server (VPS). The server may be a cloud server, a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A method of cloud computing resource extension, comprising:
    acquiring registration information of an extended Availability Zone (AZ), the extended AZ being located in a user's local computer room;
    sending the registration information to a public cloud, the public cloud being configured to register, based on the registration information, the extended AZ with an AZ set managed and controlled by the public cloud and generate deployment information of a target cloud service pre-designated by the user;
    receiving the deployment information sent by the public cloud; and
    deploying the target cloud service in the extended AZ based on the deployment information.

2. The method according to claim 1, wherein
    nodes in the extended AZ comprise: a network device and a server;
    the deployment information comprises: initialization information of the network device, initialization information of the server, and function information of the target cloud service; and
    the deploying the target cloud service in the extended AZ based on the deployment information comprises:
    sending the initialization information of the network device to the network device, so that the network device is configured to initialize the network device based on the initialization information of the network device;
    sending the initialization information of the server to the server, so that the server is configured to initialize the server based on the initialization information of the server; and
    sending the function information to the server, so that the server is configured to deploy the target cloud service based on the function information after initialization.

3. The method according to claim 1, wherein
    the registration information comprises node information of the nodes in the extended AZ; and
    the acquiring registration information of an extended AZ comprises:
    receiving, through a first channel, the node information sent by the extended AZ;
    wherein the first channel comprises: a channel between a first Admin Core (AC) and a second AC, and a channel between the second AC and an agent;
    wherein the agent is deployed in a local network in the local computer room;
    the first AC is located in the extended AZ; and
    the second AC is located in the local network.

4. The method according to claim 3, wherein the sending the registration information to a public cloud comprises:
    sending the registration information to the public cloud through a second channel;
    wherein the second channel comprises: a channel between the agent and the second AC, a channel between the second AC and the first AC, a channel between the first AC and an edge router, and a channel between the edge router and a master; or
    the second channel comprises: a channel between the agent and a Baidu Cloud Network Address Translation (BCNAT), a channel between the BCNAT and a Virtual Private Network Gateway (VPN GW), and a channel between the VPN GW and the master;
    the master is deployed in the public could; and
    the edge router and the VPN GW are both located in the public could.

5. The method according to claim 2, wherein
    the registration information comprises node information of the nodes in the extended AZ; and
    the acquiring registration information of an extended AZ comprises:
    receiving, through a first channel, the node information sent by the extended AZ;
    wherein the first channel comprises: a channel between a first Admin Core (AC) and a second AC, and a channel between the second AC and an agent;
    wherein the agent is deployed in a local network in the local computer room;
    the first AC is located in the extended AZ; and
    the second AC is located in the local network.

6. The method according to claim 5, wherein the sending the registration information to a public cloud comprises:
    sending the registration information to the public cloud through a second channel;
    wherein the second channel comprises: a channel between the agent and the second AC, a channel between the second AC and the first AC, a channel between the first AC and an edge router, and a channel between the edge router and a master; or
    the second channel comprises: a channel between the agent and a Baidu Cloud Network Address Translation (BCNAT), a channel between the BCNAT and a Virtual Private Network Gateway (VPN GW), and a channel between the VPN GW and the master;
    the master is deployed in the public could; and
    the edge router and the VPN GW are both located in the public could.

7. A method of cloud computing resource extension, comprising:
    receiving registration information of an extended AZ, the extended AZ being located in a user's local computer room;
    registering, based on the registration information, the extended AZ with an AZ set managed and controlled by a public cloud, and generating deployment information of a target cloud service pre-designated by the user; and sending the deployment information to an agent, the agent being deployed in the local computer room, the agent being configured to deploy the target cloud service in the extended AZ based on the deployment information.

8. The method according to claim 7, wherein the registering, based on the registration information, the extended AZ with an AZ set managed and controlled by a public cloud comprises:
creating AZ instances corresponding to the extended AZ on nodes in the public cloud;
the nodes in the public cloud comprising: a central cloud node, and an infrastructure cloud node.

9. The method according to claim 7, wherein the receiving registration information of an extended AZ comprises:
receiving the registration information of the extended AZ through a second channel;
wherein the second channel comprises: a channel between the agent and a second AC, a channel between the second AC and a first AC, a channel between the first AC and an edge router, and a channel between the edge router and a master; or
the second channel comprises: a channel between the agent and a BCNAT, a channel between the BCNAT and a VPN GW, and a channel between the VPN GW and the master;
wherein the agent is deployed in a local network in the local computer room;
the second AC is located in the local network;
the first AC is located in the extended AZ;
the master is deployed in the public could; and
the edge router and the VPN GW are both located in the public could.

10. The method according to claim 8, wherein the receiving registration information of an extended AZ comprises:
receiving the registration information of the extended AZ through a second channel;
wherein the second channel comprises: a channel between the agent and a second AC, a channel between the second AC and a first AC, a channel between the first AC and an edge router, and a channel between the edge router and a master; or
the second channel comprises: a channel between the agent and a BCNAT, a channel between the BCNAT and a VPN GW, and a channel between the VPN GW and the master;
wherein the agent is deployed in a local network in the local computer room;
the second AC is located in the local network;
the first AC is located in the extended AZ;
the master is deployed in the public could; and
the edge router and the VPN GW are both located in the public could.

11. An electronic device, comprising:
at least one processor; and
a memory communicatively connected with the at least one processor;
wherein the memory stores instructions executable by the at least one processor, and the instructions are executed by the at least one processor to enable the at least one processor to perform a method of cloud computing resource extension, wherein the method comprises:
acquiring registration information of an extended AZ, the extended AZ being located in a user's local computer room;
sending the registration information to a public cloud, the public cloud being configured to register, based on the registration information, the extended AZ with an AZ set managed and controlled by the public cloud and generate deployment information of a target cloud service pre-designated by the user;
receiving the deployment information sent by the public cloud; and
deploying the target cloud service in the extended AZ based on the deployment information.

12. The electronic device according to claim 11, wherein nodes in the extended AZ comprise: a network device and a server;
the deployment information comprises: initialization information of the network device, initialization information of the server, and function information of the target cloud service; and
the deploying the target cloud service in the extended AZ based on the deployment information comprises:
sending the initialization information of the network device to the network device, so that the network device is configured to initialize the network device based on the initialization information of the network device;
sending the initialization information of the server to the server, so that the server is configured to initialize the server based on the initialization information of the server; and
sending the function information to the server, so that the server is configured to deploy the target cloud service based on the function information after initialization.

13. The electronic device according to claim 11, wherein the registration information comprises node information of the nodes in the extended AZ; and
the acquiring registration information of an extended AZ comprises:
receiving, through a first channel, the node information sent by the extended AZ;
wherein the first channel comprises: a channel between a first AC and a second AC, and a channel between the second AC and an agent;
wherein the agent is deployed in a local network in the local computer room;
the first AC is located in the extended AZ; and
the second AC is located in the local network.

14. The electronic device according to claim 13, wherein the sending the registration information to a public cloud comprises:
sending the registration information to the public cloud through a second channel;
wherein the second channel comprises: a channel between the agent and the second AC, a channel between the second AC and the first AC, a channel between the first AC and an edge router, and a channel between the edge router and a master; or
the second channel comprises: a channel between the agent and a BCNAT, a channel between the BCNAT and a VPN GW, and a channel between the VPN GW and the master;
the master is deployed in the public could; and
the edge router and the VPN GW are both located in the public could.

15. The electronic device according to claim 12, wherein the registration information comprises node information of the nodes in the extended AZ; and
the acquiring registration information of an extended AZ comprises:
receiving, through a first channel, the node information sent by the extended AZ;

wherein the first channel comprises: a channel between a first AC and a second AC, and a channel between the second AC and an agent;

wherein the agent is deployed in a local network in the local computer room;

the first AC is located in the extended AZ; and the second AC is located in the local network.

16. An electronic device, comprising:

at least one processor; and a memory communicatively connected with the at least one processor;

wherein the memory stores instructions executable by the at least one processor, and the instructions are executed by the at least one processor to enable the at least one processor to perform a method of cloud computing resource extension, wherein the method comprises:

receiving registration information of an extended AZ, the extended AZ being located in a user's local computer room;

registering, based on the registration information, the extended AZ with an AZ set managed and controlled by a public cloud, and generate deployment information of a target cloud service pre-designated by the user; and sending the deployment information to an agent, the agent being deployed in the local computer room, the agent being configured to deploy the target cloud service in the extended AZ based on the deployment information.

17. The electronic device according to claim 16, wherein the registering, based on the registration information, the extended AZ with an AZ set managed and controlled by a public cloud comprises:

creating AZ instances corresponding to the extended AZ on nodes in the public cloud;

the nodes in the public cloud comprising: a central cloud node, and an infrastructure cloud node.

18. The electronic device according to claim 16, wherein the receiving registration information of an extended AZ comprises:

receiving the registration information of the extended AZ through a second channel;

wherein the second channel comprises: a channel between the agent and a second AC, a channel between the second AC and a first AC, a channel between the first AC and an edge router, and a channel between the edge router and a master; or the second channel comprises: a channel between the agent and a BCNAT, a channel between the BCNAT and a VPN GW, and a channel between the VPN GW and the master;

wherein the agent is deployed in a local network in the local computer room;

the second AC is located in the local network;

the first AC is located in the extended AZ;

the master is deployed in the public could; and the edge router and the VPN GW are both located in the public could.

19. A non-transitory computer readable storage medium with computer instructions stored thereon, wherein the computer instructions are used for causing a method of cloud computing resource extension, wherein the method comprises:

acquiring registration information of an extended Availability Zone (AZ), the extended AZ being located in a user's local computer room;

sending the registration information to a public cloud, the public cloud being configured to register, based on the registration information, the extended AZ with an AZ set managed and controlled by the public cloud and generate deployment information of a target cloud service pre-designated by the user;

receiving the deployment information sent by the public cloud; and deploying the target cloud service in the extended AZ based on the deployment information.

20. A non-transitory computer readable storage medium with computer instructions stored thereon, wherein the computer instructions are used for causing a method of cloud computing resource extension, wherein the method comprises:

receiving registration information of an extended AZ, the extended AZ being located in a user's local computer room;

registering, based on the registration information, the extended AZ with an AZ set managed and controlled by a public cloud, and generating deployment information of a target cloud service pre-designated by the user; and sending the deployment information to an agent, the agent being deployed in the local computer room, the agent being configured to deploy the target cloud service in the extended AZ based on the deployment information.

* * * * *